US010849276B2

(12) United States Patent
Matousek et al.

(10) Patent No.: US 10,849,276 B2
(45) Date of Patent: Dec. 1, 2020

(54) AIR CHUTE FEED ASSEMBLY FOR A CROSSFLOW CLEANING FAN ASSEMBLY

(71) Applicant: Tribine Industries LLC, Logansport, IN (US)

(72) Inventors: Robert A. Matousek, Valley Center, KS (US); Ray M. Price, Jr., Inman, KS (US); Dillon M. Thompson, Halstead, KS (US)

(73) Assignee: Tribine Industries, LLC, Logansport, IN (US)

( * ) Notice: Subject to any disclaimer, the term of this patent is extended or adjusted under 35 U.S.C. 154(b) by 105 days.

(21) Appl. No.: 16/208,612

(22) Filed: Dec. 4, 2018

(65) Prior Publication Data
US 2020/0060093 A1 Feb. 27, 2020

Related U.S. Application Data

(60) Provisional application No. 62/721,696, filed on Aug. 23, 2018.

(51) Int. Cl.
*A01F 12/44* (2006.01)

(52) U.S. Cl.
CPC .................. *A01F 12/444* (2013.01)

(58) Field of Classification Search
CPC .... A01D 41/1243; A01D 41/12; A01D 45/02; A01D 75/00; A01F 11/06; A01F 12/444; A01F 12/44; A01F 12/46; A01F 12/48

USPC ........................................... 460/99, 100, 115
See application file for complete search history.

(56) References Cited

U.S. PATENT DOCUMENTS

| 6,558,252 | B2 * | 5/2003 | Visagie | A01F 12/444 |
| | | | | 460/100 |
| 7,524,242 | B2 * | 4/2009 | Stukenholtz | A01D 45/02 |
| | | | | 460/115 |
| 9,033,779 | B2 * | 5/2015 | Hillen | A01F 12/444 |
| | | | | 460/99 |
| 10,561,069 | B2 * | 2/2020 | Thomas | A01F 12/444 |
| 2008/0004091 | A1 * | 1/2008 | Ricketts | A01F 12/444 |
| | | | | 460/100 |
| 2009/0163260 | A1 * | 6/2009 | Claes | A01F 12/444 |
| | | | | 460/100 |

* cited by examiner

*Primary Examiner* — Robert E Pezzuto
(74) *Attorney, Agent, or Firm* — Mueller Law, LLC; Jerry K. Mueller, Jr.

(57) ABSTRACT

A charge fan assembly is located behind the forward operator cab and draws air from about the top of the PPU and a portion of an airflow from the charge fan assembly is directed downwardly into the crossflow cleaning fan assembly. A pair of closely spaced-apart sheets create a venturi and speed up the charge fan airflow into the crossflow cleaning fan and impact the crossflow cleaning fan at an angle where the blades of the crossflow cleaning fan are widely open. The exhaust air from the crossflow cleaning fan is nearly the same across the entire lengthwise extent of the crossflow cleaning fan.

4 Claims, 8 Drawing Sheets

US 10,849,276 B2

AIR CHUTE FEED ASSEMBLY FOR A CROSSFLOW CLEANING FAN ASSEMBLY

CROSS-REFERENCE TO RELATED APPLICATIONS

The application claims benefit of provisional application 62/721,696 filed August 23, 2018, and is cross-referenced to application Ser. No. 15/642,799 filed Jul. 6, 2017 (Publication No. US 2018/0007830), now U.S. Pat. No. 10,383,278, the disclosures of which are expressly incorporated herein by reference.

STATEMENT REGARDING FEDERALLY SPONSORED RESEARCH

Not applicable.

BACKGROUND

Commonly owned U.S. Publication No. US 2018/0007830 discloses an improved airflow within a forward tractor or crop processing power unit (PPU) with all of the grain stored in a rear grain cart. It is common for the PPU, whether or not the grain is stored in the PPU, to have a cleaning fan assembly located towards the front and bottom of the PPU for bringing in a flow of air and directing the flow to the separation assembly in the PPU. Such cleaning fan assembly typically is an elongate "squirrel cage" type or crossflow fan assembly that draws air from the front of the PPU at ground level and propels the air rearwardly to the cleaning area where chaff is separated from grain. The air at the PPU front ground level tends to be quite dirty and contains entrained debris that is blown into the cleaning are by the cleaning fan. This is an undesirable situation.

A weakness of a crossflow type fan is that for a distance equal to about % of the radius of the fan taken from each end of the length of the fan, the spinning rotor will produce no airflow. This results in an air pattern exiting the fan that could be described by the curve in FIG. 6. The velocities (and volumes) at the ends are significantly less (as low as zero).

This reduction in volume causes the air pattern under the sieves to be insufficient to assist in cleaning grain in the side sections of the sieves that the air is intended to help with the sieving. These areas (along the sides of the cleaning systems) become areas of low air velocity that allows chaff and straw to fall thru the sieves, thus corrupting the thoroughness of the cleaning function. This lack of air velocity on the outer edges can also lead to material settling on these sieve areas to considerable depth and result in the mat of chaff carrying grain off the rear of the cleaning sieves and onto the ground. It is imperative that the designer of the air system finds a way to enhance the airflow in these outer regions while not necessarily reducing flow in other regions across the fan.

To state that the crossflow fan resists nearly all efforts to remedy this shortcoming is a matter of extreme understatement. Historic efforts to alter the design to allow inlet ducting, or outlet deflecting have largely been frustrated by failure to improve, and often success at making the situation worse. This one ugly characteristic of crossflow design has caused many designers to forsake the advantages of crossflow superior volume vs diameter, and unlimited length possibilities in favor of other types of fans that cannot provide adequate air volume.

One aspect of the disclosure in Publication No. US 2018/0007830 relevant for present purposes is provision of a charge fan assembly at the top of the PPU where a portion of its airflow is directed downwardly into the cleaning fan assembly. A cleaning fan housing typically carries the elongate "squirrel cage" fan assembly. An air guide vane is located rearwardly of the cleaning fan assembly and may have a pair of spaced apart, angled guide vanes on its top surface and a pair of angled, spaced apart guide vanes. The elongate cleaning fan tends to exhaust most of its air in its central portion with a low amount of air at its ends. Thus, U.S. Publication No. 2018/0007830 proposes deflector plates to direct an amount of air to the ends of cleaning fan assembly to even out the airflow along its widthwise extent. Unfortunately, such scheme has been determined to not adequately even out the flow along the longitudinal extent of the elongate cleaning fan assembly.

It is to providing a novel solution to this problem that the present disclosure is directed.

BRIEF SUMMARY

A charge fan assembly is located behind the forward operator cab and draws air from about the top of the PPU and a portion of an airflow from the charge fan assembly is directed downwardly into the crossflow cleaning fan assembly. A pair of closely spaced-apart sheets create a venturi and speed up the charge fan airflow into the crossflow cleaning fan and impact the crossflow cleaning fan at an angle where the blades of the crossflow cleaning fan are widely open. The exhaust air from the crossflow cleaning fan is nearly the same across the entire lengthwise extent of the crossflow cleaning fan.

BRIEF DESCRIPTION OF THE DRAWINGS

For a fuller understanding of the nature and advantages of the present method and process, reference should be had to the following detailed description taken in connection with the accompanying drawings, in which.

Figure 1:
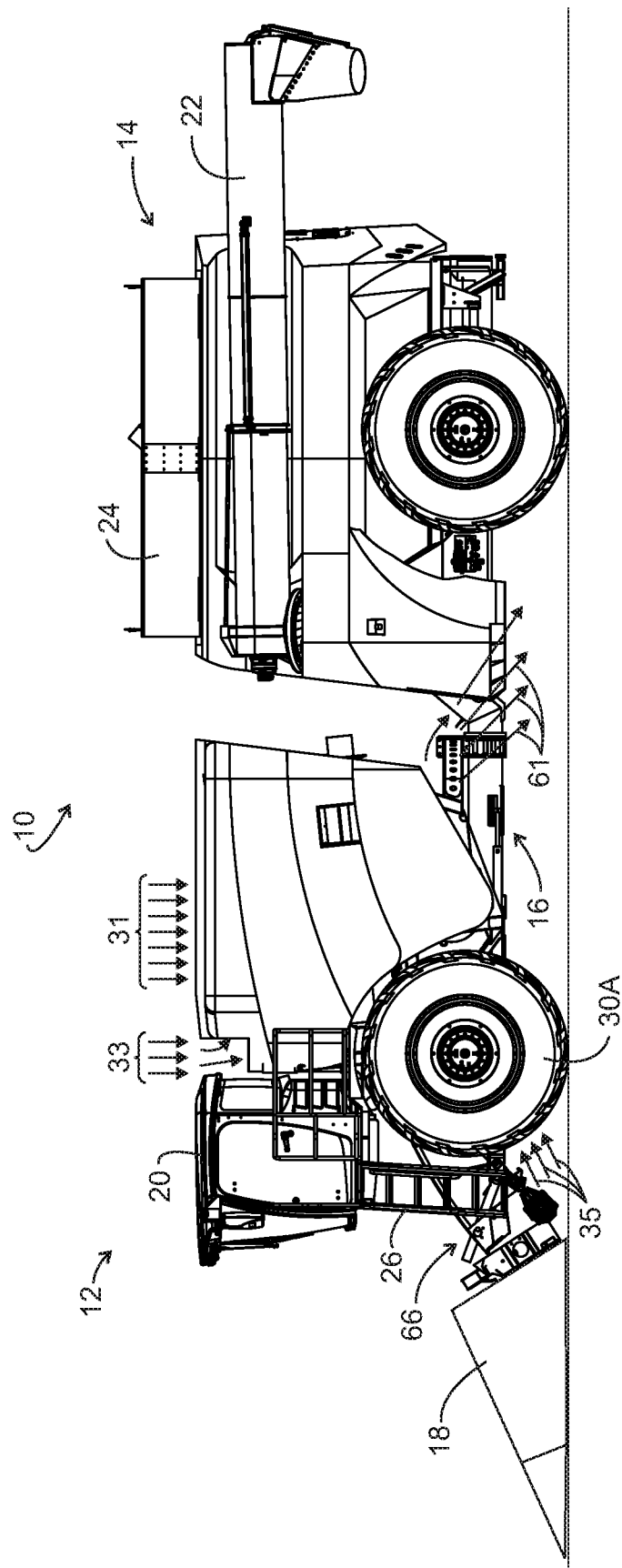
FIG. 1 is a side elevation view of the articulated combine of a forward tractor or crop processing power unit (PPU) and rear grain cart in which the grain is stored.
Figure 2:
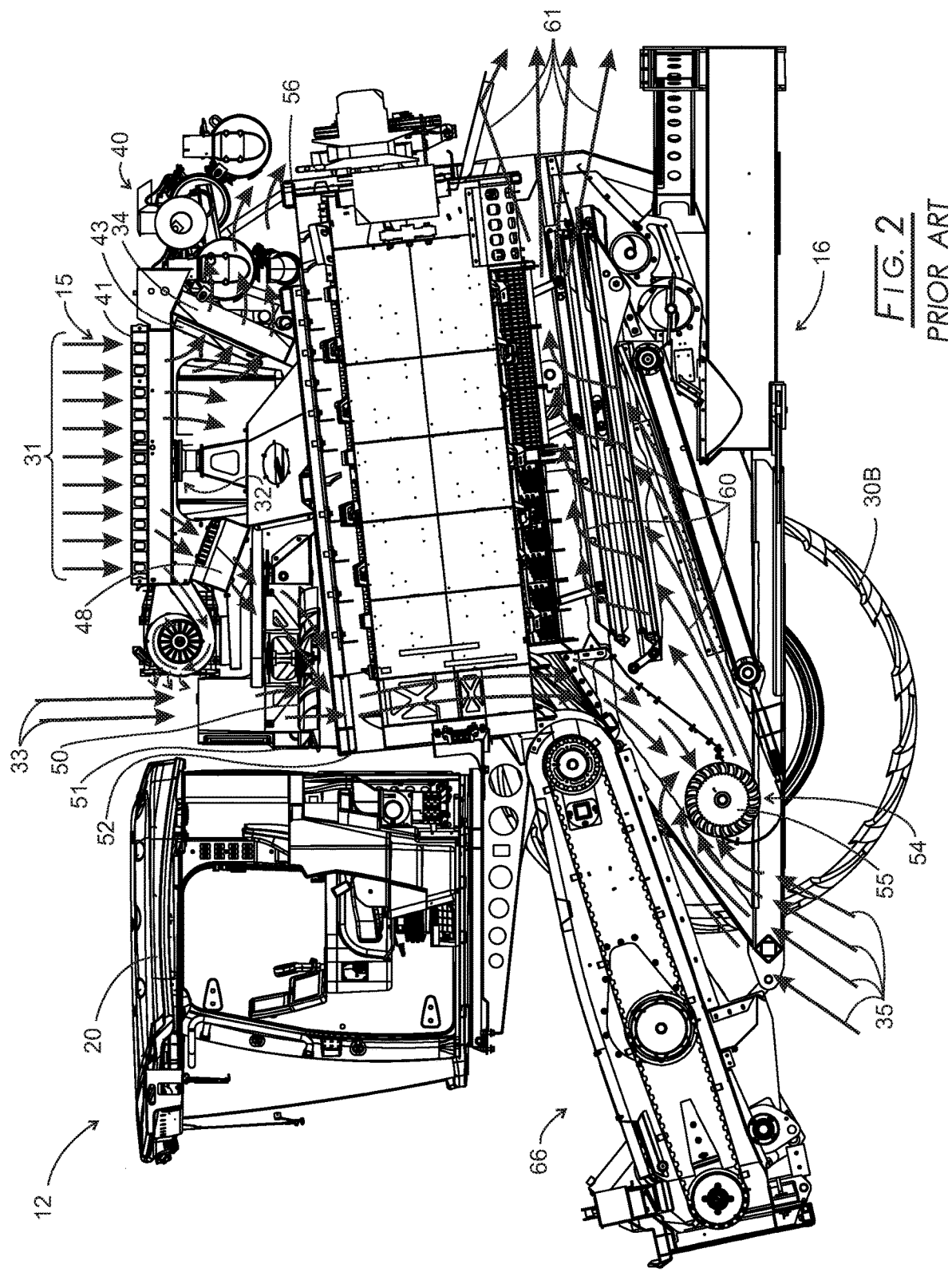
FIG. 2 is a lengthwise sectional view through the PPU showing a prior art crossflow cleaning fan assembly.

The drawings will be described in greater detail below.

DETAILED DESCRIPTION

The airflow disclosed in Publication No. US 2018/0007830, cited above, is a substantial improvement over the art. However, it was unexpected discovered how to improve the airflow distribution of the cleaning fan. Thus, FIGS. 1-4, labelled as Prior Art, are taken from Publication No. US 2018/0007830. The remaining figures disclose the cleaning fan improvement. But for the cleaning fan improvement disclosed herein, the remainder of the harvesting combine is the same as is disclosed in the Prior Art labelled drawings.

Referring, then, to FIGS. 1-4, an articulated harvester, 10, consists of a powered PPU, 12, a rear grain cart, 14, and an articulation joint, 16, that connects PPU 12 with rear grain cart 14. The details of articulation joint 16 are disclosed in commonly owned Publication No. US 2017/0142901. PPU 12 carries a grainhead, 18, operator's cab, 20, grain cleaning and handling assembly, and engines. PPU 12 is devoid of any grain storage, such being exclusive in rear grain cart 14. While both PPU 12 and rear grain cart 14 are shown being carried by wheel assemblies, one or both could be tracked. A screened air inlet, 15, is located atop PPU 12 where the air likely is the cleanest around harvesting combine 10. Grainhead 18 is carried by a feedhouse assembly, 66, as described in detail in Publication No. US 2018/0007832, now U.S. Pat. No. 10,426,089 cited above, but for the location of the rock roller assembly and rock sump, 68, that have been moved to the inward rear of feed house assembly 66.

An off-loading auger assembly, 22, is in the folded home position and being carried by rear grain cart 14. Grain cart 14 also bears a foldable roof, 24, shown in an open position, but which can fold inwardly to cover grain stored in rear grain cart 14. Foldable roof 24 may be made of metal, plastic, or other suitable material, but may be made of durable plastic for weight reduction and easy folding/unfolding. A grain storage bin is carried by grain cart 14 may be made of plastic also in keeping with desirable weight reduction; although, it could be made of metal also at the expense of weight. All plastic parts may be filled with particulate or fiber reinforcement in conventional fashion and could be laminate in construction. Further details on rear grain cart 14 can be found commonly owned U.S. Pat. No. 9,901,030. The operator is granted access to cab 20 by a stair assembly, 26, that extends upwardly from just above the ground.

Of interest for present purposes are the various locations and assemblies for admitting air into PPU 12 for a variety of purposes. Initially, air is admitted into PPU 12 fairly centrally atop PPU 12 as indicated by arrows 31. This location was chosen, as it arguably will be the cleanest flow of air around PPU 12. Various arrows will be used in this description to show the general direction and location of various major airflow paths into PPU 12, within PPU 12, and exhausted from PPU 12. Additional airflow admittance into PPU 12 is from the top front thereof just behind cab 20, as indicated by arrows 33. A third major airflow path into PPU 12 is at the front bottom thereof between the PPU wheel/assemblies, 30A and 30B, as indicated by arrows 35. Most of the air from within PPU 12 will be exhausted from the rear thereof, as indicated by arrows 61. Fourth airflow paths are inlets at each of the two rear outer corners of cab 20 in front of the side styling panels and below the styling front hood.

Airflow 31 enters atop PPU 12 through a grate, 41. This location was chosen, as it arguably will be the cleanest flow of air around PPU 12. Radiators, as typified by a radiator, 34, surround or cooling fan assembly 32 and are coolingly connected with a pair of engines (not shown). A single air conditioning condenser, 43, sits adjacent to radiator 34 for cooling cab 20. One of the engines powers the hydraulics and cooling functions/airflow movement for articulated combine 10, while the other engine powers all other components of articulated combine 10. The dual engines aspect will be described in detail in commonly owned Publication No. US 2018/0009305, now U.S. Pat. No. 10,257,977..

Large capacity (cooling) fan assembly 32 that pulls clean air 31 from the top of PPU 12, pushes the air out through a rear water radiator 34, and out onto a hot exhaust treatment system, 40 to keep all surfaces free of chaff/dust and for cooling purposes; and pushes air out through front hydraulic cooler, 48 and forward and down into the cleaning charge air fan, 50 (located in a round ring that is in the middle of the hydraulic reservoir, 51) that is forcing air downwardly and through plenums associated with sidesheets surrounding the concaves (not shown) and a forward bulkhead, 52 that direct the high pressure air downwardly until it reaches the upper rear portion of a cleaning fan assembly, 54, where it comingles with air 35 drawn from in front of fan assembly 54. Coincident with a rear plenum bulkhead, 56 (FIG. 2), are forward bulkhead 52 louvers that bleed off some of this air and direct it through the wall and rearward along the side of the rotor (concaves) to effectively pre-clean the MOG from the grain shooting through the concaves by the rotor. Fan blades of fan assembly 32 can be rotated, reversing the airflow, cleaning the radiator 34, condenser 43, and oil cooler 48, of debris.

Perhaps, about 5,000 to 10,000 cfm of cooling air comingled with about 5,000 to 10,000 cfm of ambient air from above charge fan 50 are transported down to cleaning fan assembly 54, which likely is asking for about 30,000 cfm of air. This design is want to do this because, if we allow cleaning fan assembly 54 near the ground to pull all 30,000 from in front of fan assembly 54, it will likely pull a lot of residue off the ground (inlet vortices sweeping the soil) and plug the undersides of the sieves, which is a deleterious occurrence.

The air from cleaning fan assembly 54, then, is propelled rearward and upward (see arrows 60 in FIG. 2), being squeezed by the clean grain conveyor surface, through the main (center, full length) sieves to carry away chaff from the sieves to enhance sieve capacity. This air will track mostly straight rearward and will not comingle with the bonus sieve air.

Figure 3:
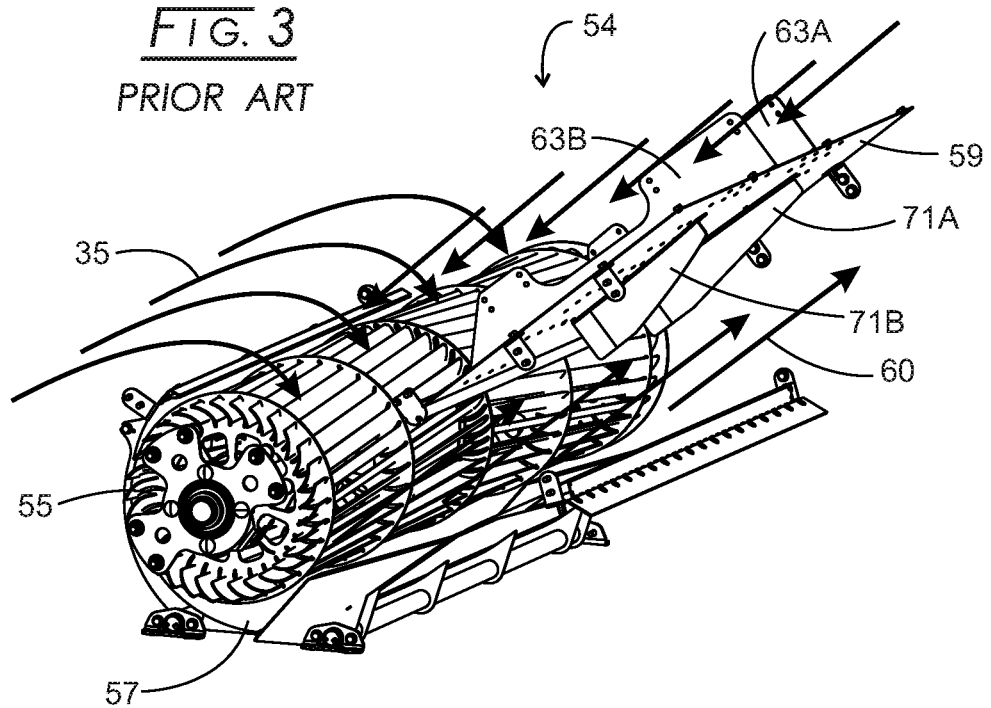
FIG. 3 is an isometric view of the prior art crossflow cleaning fan assembly of FIG. 2.
Figure 4:
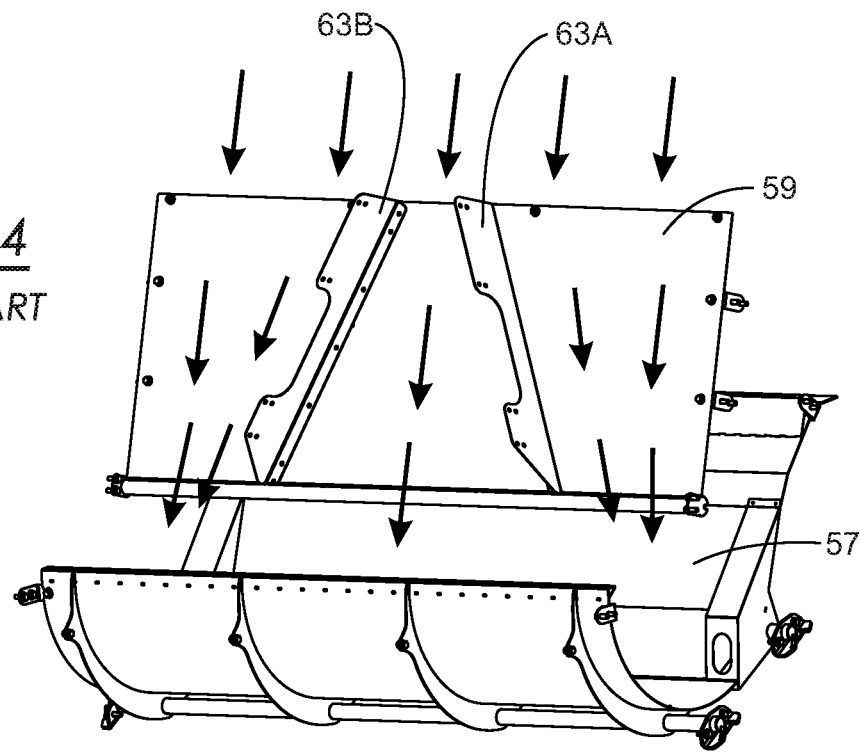
FIG. 4 is an isometric view of the prior art crossflow cleaning fan assembly of FIG. 3 with the rotating fan itself removed to see the guide vanes on the divider plate.

Cleaning fan assembly 54 also is shown in further detail in FIGS. 3 and 4. In particular, a cleaning fan housing, 57, carries an elongate "squirrel cage" fan, 55. An air guide vane, 59, is located rearwardly thereof and has a pair of spaced apart, angled guide vanes, 63A and 63B, on its top surface and a pair of angled, spaced apart guide vanes, 71A and 71B. Elongate fan 55 tends to exhaust most of its air in its central portion with a low amount of air at its ends. The deflector plates direct an amount of air to the ends of clean fan assembly 54 to even out the airflow along its widthwise extent. Deflector plate 59 is adjustable, as are the deflector plates.

Figure 5:
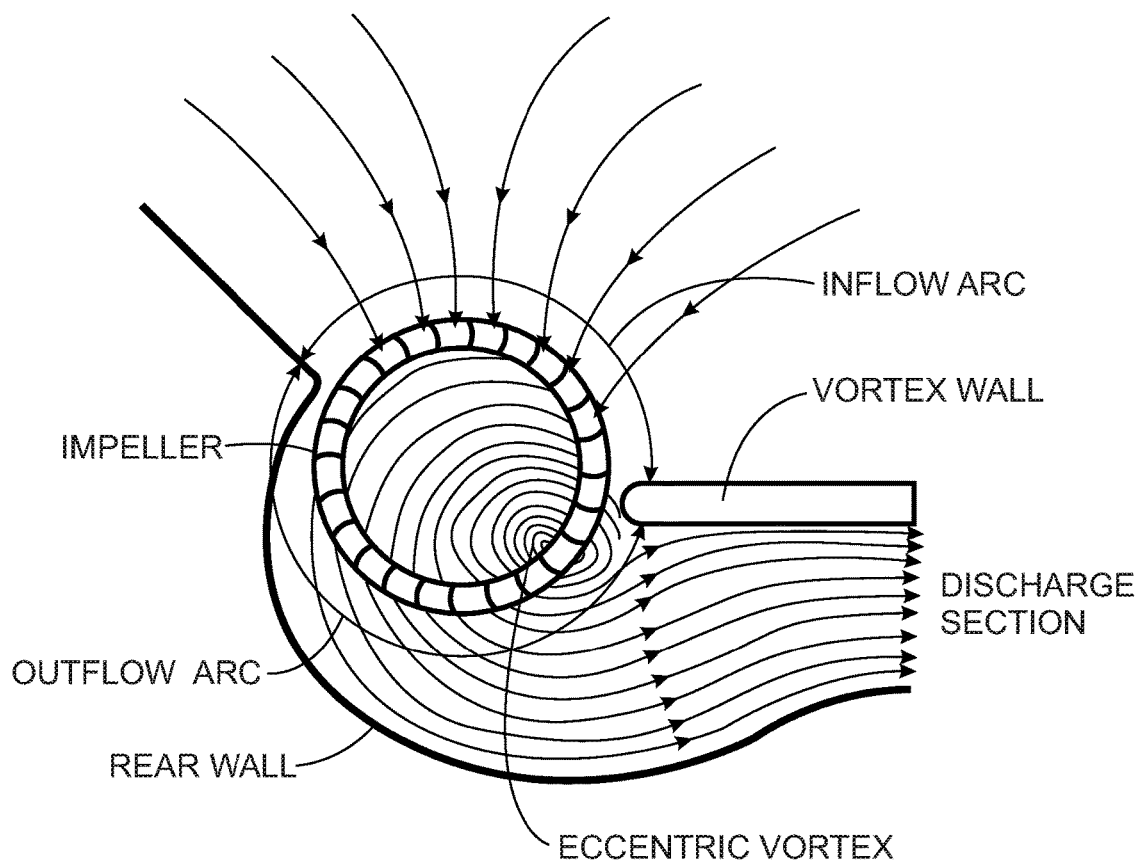
FIG. 5 is a schematic of the airflows associated with the prior art crossflow cleaning fan assembly of FIGS. 3-5.
Figure 6:
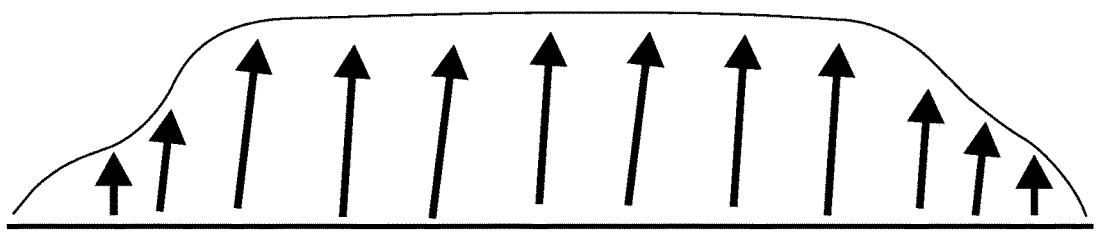
FIG. 6 is the airflow pattern exhibited by the prior art crossflow cleaning fan of FIGS. 3-5.
Figure 7:
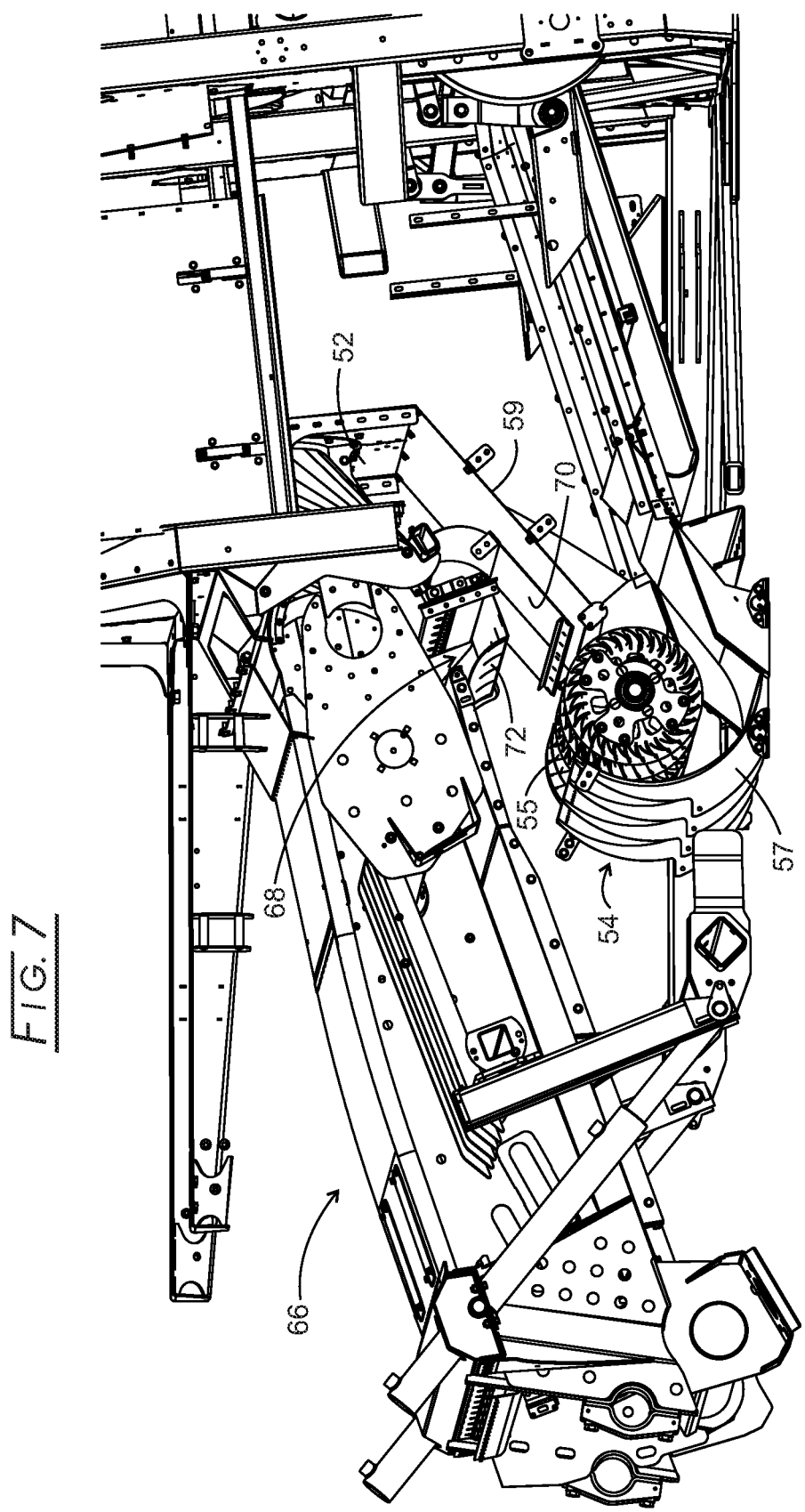
FIG. 7 is an isometric view of the new crossflow cleaning fan assembly disclosed herein.
Figure 8:
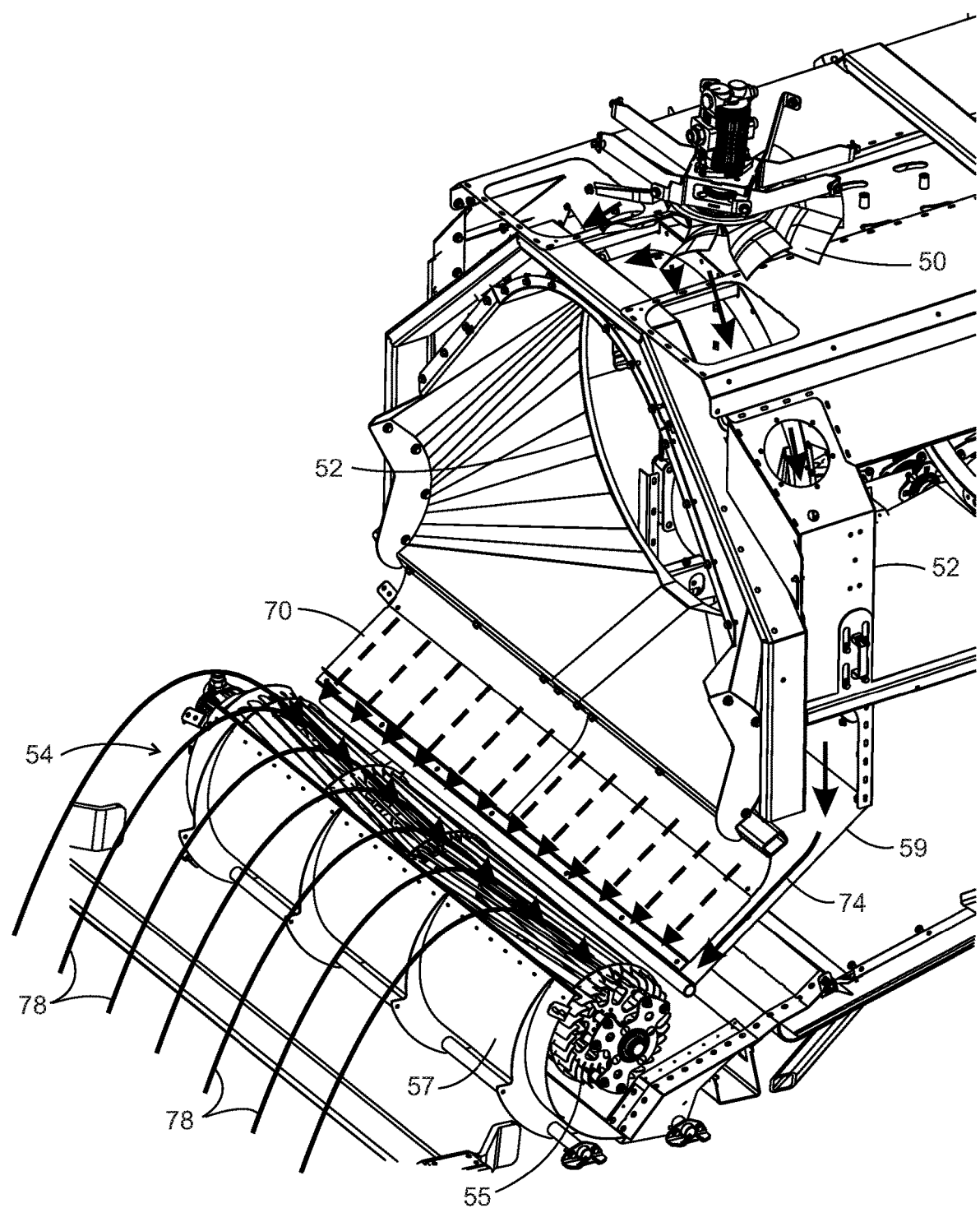
FIG. 8 is an overhead isometric view of the feed air to the airflow new crossflow cleaning fan assembly disclosed herein.
Figure 9:
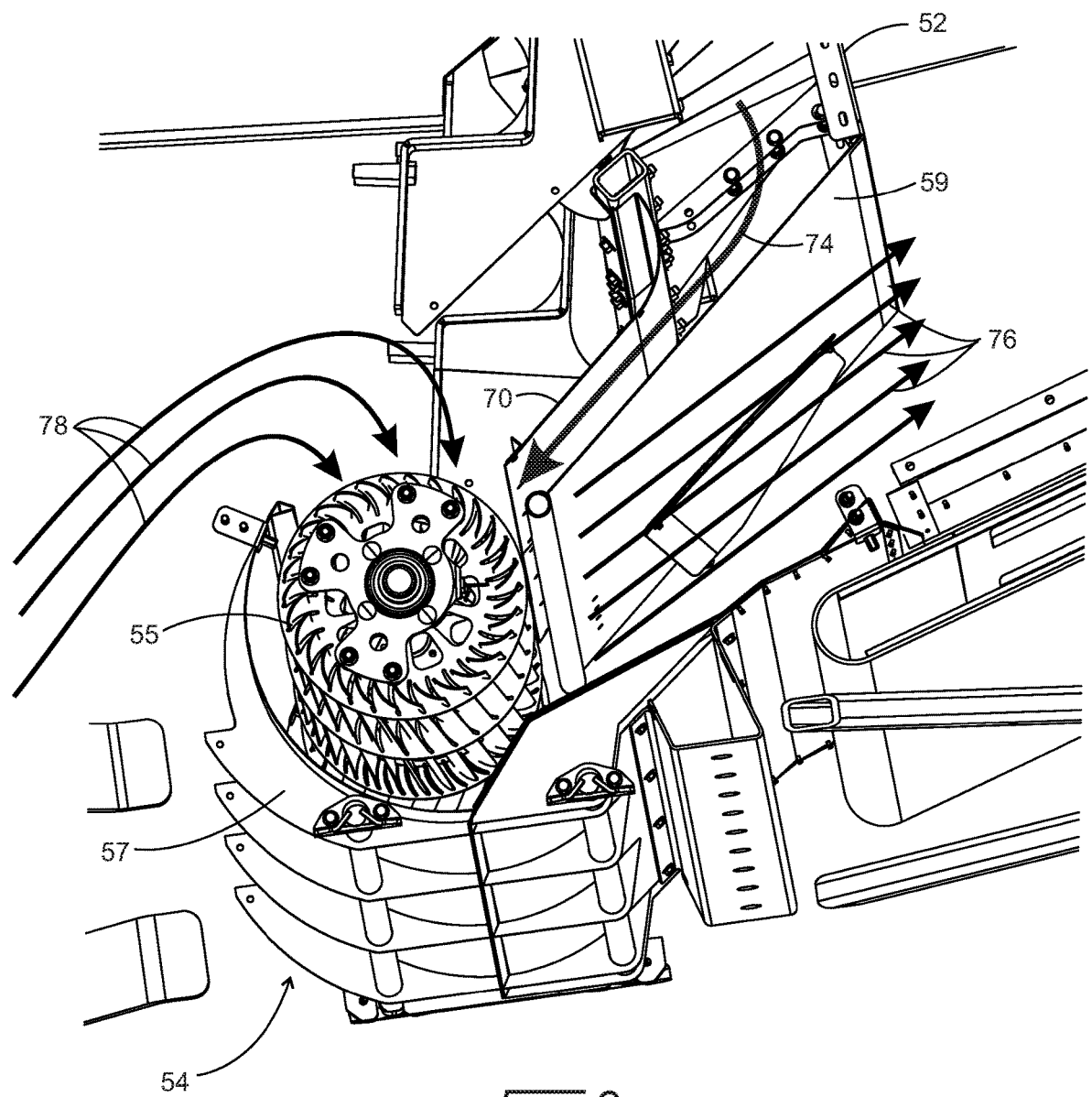
FIG. 9 is an inferior isometric view of the feed air to the airflow new crossflow cleaning fan assembly disclosed herein.
Figure 10:
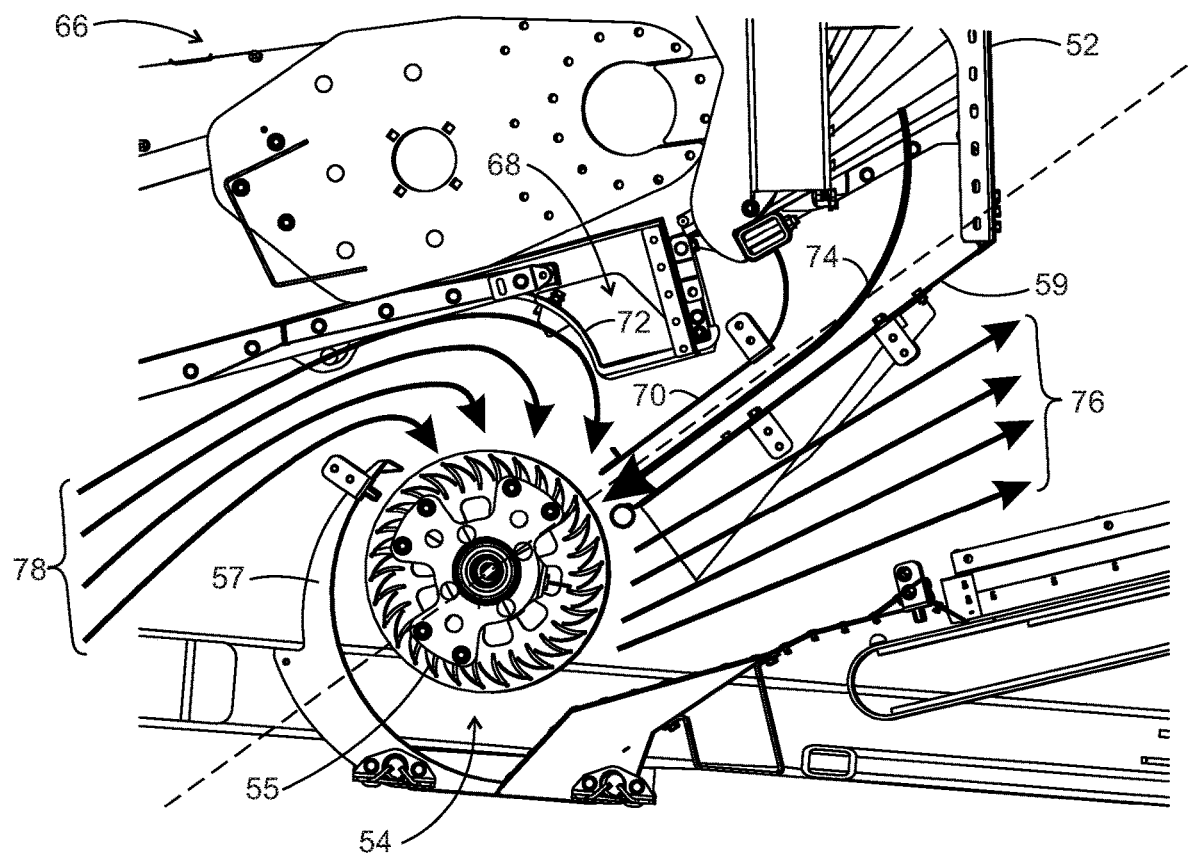
FIG. 10 is side sectional view of the new crossflow cleaning fan assembly disclosed herein and airflow associated therewith.

Despite the efforts in adding deflector plates 63A and 63B to crossflow cleaning fan 55 of clean fan assembly 54, the airflow still exhibited the airflow pattern shown in FIG. 6. Charge fan 50 powers a good deal of air from the top of the machine to the lower regions of the machine, and the ducting within the chassis of the machine is such that the air from the top is delivered to the bottom, very near the proximity of the inlet to crossflow fan 55. FIG. 5 shows the inlet characteristics of a crossflow design. Some air is taken in around the perifery of the fan inlet (inflow arc), however the attraction of the air gets greater the nearer it gets to the eccentric vortex (the low pressure area of this hurricane). Inlet velocities in the region above the vortex wall can be multiple times faster than velocities of the other arrows near the top and front. Still, the prior art design in the drawings permitted a significant amount of air from the top of the machine to be fed to crossflow cleaning fan 55 and less dirty air from the ground in front of the machine.

A key discovery to this invention was that in order to significantly affect the output of crossflow cleaning fan 55, the injection of the air from charge fan 50 must be done in a specific configuration. The first important configuration is in the design of the delivery chute from charge fan 50 to the crossflow. This configuration is shown in FIGS. 7-10. A bottom sheet, 59, of the fan discharge which starts at the cutoff pipe at the rear of the fan rotor and extends upward to threshing rotor front bulkhead wall 52, serves to confine the air stream on its bottom, while a new sheet, 70, curves from the rotor inlet support tube, down and forward to near fan rotor 55. Two sheets 70 and 59 run parallel to each other as they approach fan 55, and are spaced apart approximately, for example, 3". These sheets, thus, force all the charge air to be delivered at high velocity to the hungriest portion of the fan inlet opening by creating a venturi that speeds up the airflow therebetween.

Also of importance to the invention is the shaping of the feeder floor of feed house 66 above crossflow fan 55. This is an area of high inlet velocity flow that changes shape as feeder 66 moves up and down in operation. This area is significantly congested (for airflow) by the presence of rock sump 68 on the bottom of feed house 66, used to trap rocks brought in by the feed conveyor, but preferably not injested by the rotor. By curving front surface or wall, 72 (see FIG. 10), of the rock sump door to streamline it for airflow, the stream of airflowing into fill the remainder of the fan inlet opening (in example an arc of perhaps 12" to 15") is efficiently directed down into the spinning fan rotor.

With this configuration and in these approximate proportions, the amount of air brought in from the upper charge fan duct nearly matches the volume of air pulled in by the remainder of the inlet opening in the operational parameters required for producing sufficient air for the cleaning function of the machine. A measure of the proportions would be approximately 40% to 60% split of one inlet versus the other, and those proportion can likely reverse and vary within that range.

Figure 11:
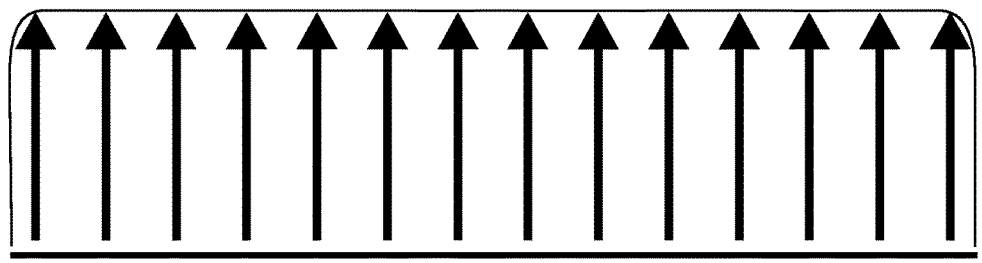
FIG. 11 is the airflow pattern exhibited by the new crossflow cleaning fan assembly disclosed herein.

Coincidentally and also of importance to the operation of the cleaning system, this high velocity injection of air into the proximity of the highest feeding location of the crossflow fan has caused the remedy of the aforementioned dead air locations at the ends of the fans. That is, the high velocity of isolated air injected evenly across the "sweet spot" (see arrow 74 in FIG. 10) into crossflow fan 55. The high velocity air is injected by the pressure of charge fan 50 and directed evenly across the hungriest portion of the crossflow fan inlet opening by a duct created by sheets 70 and 59 at an optimum angle adjacent to the airflow outlet of crossflow fan 55, as indicated by arrows 76 in FIG. 10. This high velocity air (see arrow 74) is injected—not drawn in—due to the venturi effect created between sheets 70 and 59. The characteristics of crossflow fan 55 are such that when the air is drawn in (see arrows 78), the inlet area adjacent to the fan outlet area is starved of air. This is due to the air being drawn into the inlet opening of rotating angled fins of crossflow fan 55. It is necessary to isolate the injected charge fan air (arrow 74) from the air (arrow 78) being drawn in by crossflow fan 55 such that the high velocity air is injected into the inlet of crossflow fan 55 when the fin angle is at its fullest opening (the "sweet spot"), which is indicated by arrow 74. This isolated injected air stabilizes the inlet air across crossflow fan 55 causing the outlet air (arrows 76) to be evenly dispersed across the outlet of the crossflow fan. The otherwise "bell curve" distribution of the discharge air of the fan is now nearly a straight line velocity distribution as seen in FIG. 11, and the performance of the cleaning function is much, much improved.

While the apparatus, system, and method have been described with reference to various embodiments, those skilled in the art will understand that various changes may be made and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

We claim:

1. An improved harvesting combine powered by an internal combustion engine, a forward operator cab, a crossflow cleaning fan assembly located about a the forward bottom of the harvesting combine and having blades and a lengthwise extent, a charge fan assembly located behind the forward operator cab wherein a portion of an airflow therefrom is directed downwardly into the crossflow fan assembly, and rotor and concaves assembly for threshing grain, the improvement which comprises:

a pair of closely spaced-apart sheets located adjacent to the crossflow cleaning fan assembly and accepting the portion of the airflow from the charge fan assembly to feed the crossflow fan assembly and having an exhaust air, the pair of closely-spaced apart sheets creating a venturi for speeding up the portion of the airflow from the charge fan assembly into the crossflow cleaning fan assembly and impacting the crossflow cleaning fan at an angle where the blades of the crossflow cleaning fan are widely open, the velocity of the exhaust air from the crossflow cleaning fan being about nearly the same across the entire lengthwise extent of the crossflow cleaning fan assembly.

2. The improved harvesting combine of claim 1, wherein a rear grain cart stores harvested grain from the harvesting combine.

3. The improved harvesting combine of claim 2, wherein which is attached to the rear grain cart by an articulating joint assembly.

4. The improved harvesting combine of claim 1, wherein a rock sump is located above the crossflow cleaning fan assembly, wherein the rock sump has a curved front wall.

* * * * *